United States Patent [19]

Sakamoto et al.

[11] Patent Number: 4,951,080

[45] Date of Patent: Aug. 21, 1990

[54] DEVICE FOR CONTROLLING THE AMOUNT OF EMISSION OF ELECTRONIC FLASH APPARATUS

[75] Inventors: Hiroshi Sakamoto; Norikazu Yokonuma, both of Tokyo, Japan

[73] Assignee: Nikon Corporation, Tokyo, Japan

[21] Appl. No.: 354,352

[22] Filed: May 19, 1989

[30] Foreign Application Priority Data

May 24, 1988 [JP] Japan .................. 63-127682
Jul. 27, 1988 [JP] Japan .................. 63-187119

[51] Int. Cl.$^5$ .................. G03B 15/05; H05B 41/14
[52] U.S. Cl. .................. 354/414; 354/416; 354/433; 315/241 P; 315/151
[58] Field of Search .............. 354/414, 416, 417, 419, 354/429, 431, 432, 433; 315/241 P, 151, 159

[56] References Cited

U.S. PATENT DOCUMENTS

| | | | |
|---|---|---|---|
| 3,667,357 | 6/1972 | Matsuda | 354/414 |
| 3,792,484 | 2/1974 | Tsujimoto et al. | 354/417 |
| 4,329,623 | 5/1982 | Hattori | 315/151 |
| 4,331,400 | 5/1982 | Brownstein et al. | 354/417 X |
| 4,589,756 | 5/1986 | Saegusa | 354/432 |
| 4,660,956 | 4/1987 | Yokonuma | 354/432 |
| 4,769,666 | 9/1988 | Kumakura | 354/416 X |
| 4,809,030 | 2/1989 | Takagi et al. | 354/416 X |

FOREIGN PATENT DOCUMENTS

| | | |
|---|---|---|
| 60-64331 | 4/1985 | Japan . |
| 61-208039 | 9/1986 | Japan . |
| 62-90633 | 4/1987 | Japan . |

Primary Examiner—W. B. Perkey
Attorney, Agent, or Firm—Shapiro and Shapiro

[57] ABSTRACT

A light emission controlling device for an electronic flash apparatus includes a first photometric unit for metering a first region of an object field in a weighted manner and outputting first photometric informaiton with a lapse of time; a second photometric unit for metering a second region of the object field in a weighted manner and outputting second photometric information with a lapse of time; a comparing unit for comparing the first photometric information with the second photometric information; and a controlling unit for determining timing for outputting a light emission stop signal on the basis of the relationships between the first photometric information and the second photometric information.

22 Claims, 11 Drawing Sheets

FIG. IA
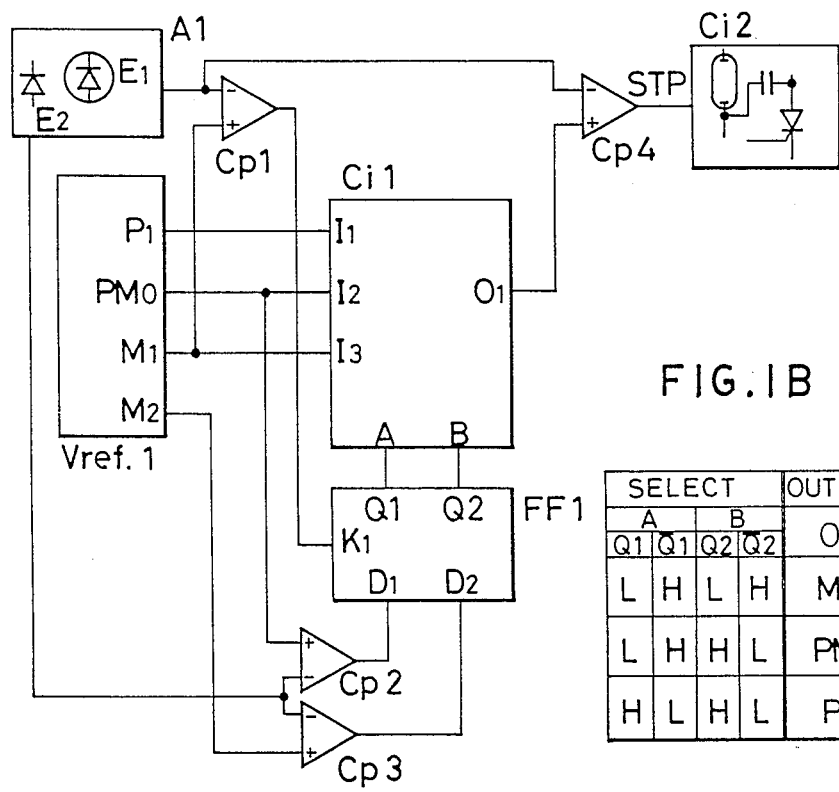
FIG. IB
| SELECT | | | | OUTPUT |
|---|---|---|---|---|
| A | | B | | $O_1$ |
| $Q_1$ | $\overline{Q_1}$ | $Q_2$ | $\overline{Q_2}$ | |
| L | H | L | H | $M_1$ |
| L | H | H | L | $PM_0$ |
| H | L | H | L | $P_1$ |
FIG. 2A   FIG. 2C
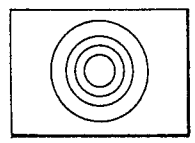 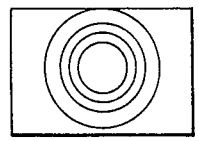
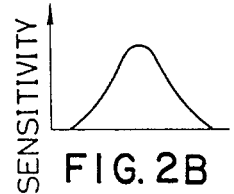 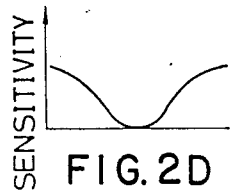
FIG. 2B   FIG. 2D
FIG. 3A
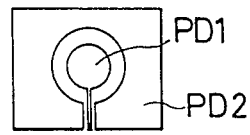
FIG. 3B FIG.4A
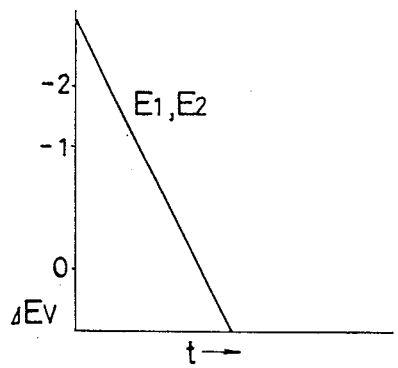
FIG.4B
STP _____
FIG.5A
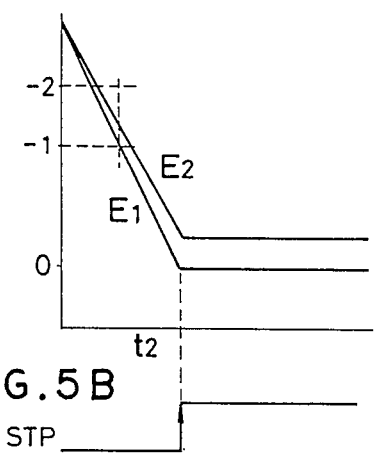
FIG.5B
STP _____|‾‾‾
FIG.6A
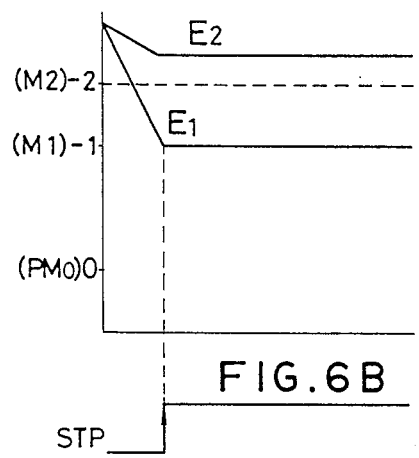
FIG.6B
STP ___|‾‾‾‾‾
FIG.6C
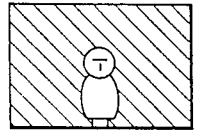
FIG.7A
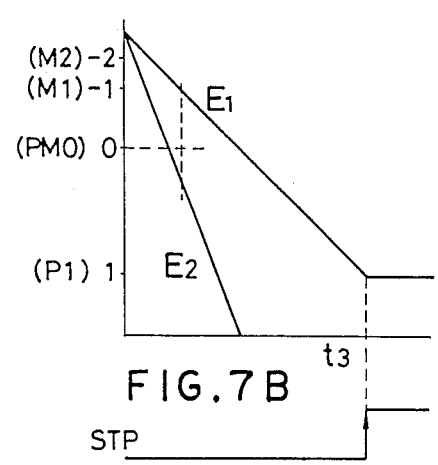
FIG.7B
STP _____|‾‾
FIG.7C
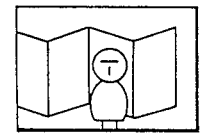

DEVICE FOR CONTROLLING THE AMOUNT OF EMISSION OF ELECTRONIC FLASH APPARATUS

BACKGROUND OF THE INVENTION

Field of the Invention

The present invention relates to a device for controlling the amount of light emission of an electronic flash apparatus.

As a conventional light emission controlling device of this type, a TTL automatic light-adjusting device is known in which the light reflected from the object is received by one light-receiving element and, when the amount of light received, i.e., a photometric value, reaches a predetermined value in correspondence with a reference exposure, the emission of light is stopped. In addition, as disclosed in Japanese Pat. Laid-Open No. 62-90633, a device is known in which multiple-division metering is carried out, and control of the amount of emission is conducted on the basis of the largest value thereof. In addition, as disclosed in U.S. Pat. No. 4,589,756, a method of multiple-division metering is known as a method of controlling the exposure of photographing under normal light.

However, with a conventional TTL device, there is a problem in that, in cases where the light reflected from the subsidiary object is extremely stronger or weaker than the light reflected from the main object, if emission is stopped at a predetermined value corresponding to a reference exposure, an appropriate exposure cannot be obtained for the main object. In addition, with the above-described conventional light emission controlling device of the multiple-division metering method, since the maximum value among the divided measurement values is used as the criterion for stopping the emission, in cases where, for instance, the subsidiary object is located at a position closer to the light-emitting tube than the main object, there are cases where it is impossible to obtain an appropriate exposure in the same way as described above. Furthermore, the conventional multiple-division metering method used in photographing under normal light takes time in performing a calculation since a complicated calculation of exposure is required, so that it has not been able to control an apparatus in which light emission is completed within a very short time, such as an electronic flash apparatus.

SUMMARY OF THE INVENTION

Accordingly, one object of the present invention is to provide a light emission controlling device for an electronic flash apparatus which permits correction of a light emission for imparting an appropriate exposure to an object without being affected by a background or a surrounding scene.

Another object of the present invention is to provide a light emission controlling device for an electronic flash apparatus which has a plurality of photometric means for metering different regions of an object field in a weighted manner, and in which the light reflected from the object illuminated by flash generating means is metered by the plurality of photometric means, and an emission stop signal is output to the flash generating means on the basis of the photometric outputs, thereby controlling the amount of light emitted by the flash generating means.

Still another object of the present invention is to provide a light emission controlling device for an electronic flash apparatus which has a plurality of photometric means for metering different regions of an object field in a weighted manner, and in which the light reflected from the object illuminated by flash generating means is metered by the plurality of photometric means and is output as items of photometric information, respectively, thereby controlling the flash generating means on the basis of the items of photometric information.

A further object of the present invention is to provide a light emission controlling device for an electronic flash apparatus which has a plurality of photometric means for metering different regions of an object field in a weighted manner, and in which the light reflected from the object illuminated by flash generating means is metered by the plurality of photometric means and is output as information based on integration values of the respective quantities of light, thereby outputting an emission controlling signal for controlling the flash generating means when a predetermined relationship exists between the items of information.

In addition, in the above-described light emission control, numerous reference voltages corresponding to reference exposures and other reference values are constantly required, so that in order to effect a precise control, numerous reference voltages must be used, and comparators for making determinations also tend to increase, thereby disadvantageously increasing the space for the circuits and resulting in increased production costs. Accordingly, a still further object of the present invention is to provide a light emission controlling device for an electronic flash apparatus which makes it possible to obtain precise correction in correspondence with the situation of the object field with a minimum circuit configuration at the time of photographing with a flash apparatus.

A further object of the present invention is to provide a light emission controlling device for an electronic flash apparatus which has a plurality of photometric means for metering different regions of an object field in a weighted manner, and in which the light reflected from the object illuminated by flash generating means is metered by the plurality of photometric means and which outputs values based on values of light-quantity integration, respectively, each photometric means including means for non-linearly converting an integration value, an output value output from that photometric means corresponding to an integration value metered by the photometric means and converted non-linearly, and outputting an emission controlling signal for controlling the flash generating means when a predetermined relationship exists between the output values.

In the present invention, when a photometric output of a specific region of an object field has reached a predetermined value, a comparison of magnitude is made between the photometric output of the specific region and that of a region outside it. On the basis of the result of that comparison, (1) an emission is stopped when a photometric output of the specific region becomes a value corresponding to an underexposure relative to a reference exposure. Alternatively, (2) the emission is stopped when a photometric output of a specific region reaches a value corresponding to the reference exposure. Alternatively, (3) the emission is stopped when a photometric output of a specific region becomes a value corresponding to an overexposure relative to the reference exposure. As a result, it is possible to obtain an appropriate exposure for the specific region without being affected by a background or a surrounding scene.

In addition, in the present invention, the photometric output from the photometric means undergoes monotonous change with time due to the reflected light of an illuminating flash light. When a photometric output of a specific region reaches a first reference voltage, a first comparison output is output from first comparing means. At this juncture, if a photometric output of a region outside the specific region is within a range determined by an initial second reference voltage corresponding to an initial first reference voltage, it means that second comparing means has output a second comparison output. Consequently, the light emission stop signal outputting means outputs an emission stop signal. In addition, if the emission is not stopped in this initial condition, when photometric outputs of the specific region consecutively reach the first reference voltage, a first comparison output is delivered, and if a second comparison output has already been output at this time, the emission is stopped.

In addition, in accordance with the light emission controlling device for an electronic flash apparatus in accordance with the present invention, at least two photometric means are provided for different regions of the object field to be metered in a weighted manner, and at least one of the photometric outputs of the photometric means is converted and compared, and the emission is stopped when the relative relationship between the two has inverted. Accordingly, numerous reference voltages and comparators necessary for precise control, as have been necessary, can be dispensed with, and it is possible to effect light emission control for providing precise correction in correspondence with the situation in the object field through a simple circuit configuration.

BRIEF DESCRIPTION OF THE DRAWINGS

FIG. 1A is a block diagram illustrating a first embodiment of a device for controlling the light emission of an electronic flash apparatus in accordance with the present invention, while FIG. 1B is a diagram illustrating truth values;

FIGS. 2A to 2D are diagrams illustrating the distribution of sensitivity (orientation characteristics) of a light-receiving element used commonly in various embodiments, in which FIGS. 2A and 2B illustrate a light-receiving element in a central portion, while FIGS. 2C and 2D illustrate the light-receiving element in a surrounding portion.

FIGS. 3A and 3B illustrate an example of the light-receiving element used commonly in the respective embodiments, in which FIG. 3A is a top plan view, while FIG. 3B is a side-elevational view;

FIG. 4A is a graph illustrating a photometric value $E_1$ for the center and a photometric value $E_2$ for the surrounding field with respect to an object having a uniform reflectivity, while FIG. 4B is a wavefrom diagram of a light emission stop signal;

FIG. 5A is a graph illustrating a photometric value $E_1$ for the center and a photometric value $E_2$ for the surrounding field with respect to an object which has a substantially uniform reflectivity and does not require correction, while FIG. 5B is a waveform diagram of a light emission stop signal;

FIGS. 6A to 6C are diagrams illustrating a state in which the exposure of a central portion is liable to become overexposure, in which FIG. 6A is a graph illustrating the photometric value $E_1$ for the center and the photometric value $E_2$ for the surrounding field, FIG. 6B illustrates a waveform diagram of a light emission stop signal, and FIG. 6C is a diagram illustrating an example of the object;

FIGS. 7A to 7C are diagrams illustrating a state in which the exposure of a central portion is liable to become underexposure, in which FIG. 7A is a graph illustrating the photometric value $E_1$ for the center and the photometric value $E_2$ for the surrounding field, FIG. 7B illustrates a waveform diagram of a light emission stop signal, and FIG. 7C is a diagram illustrating an example of the object;

Figure 8:
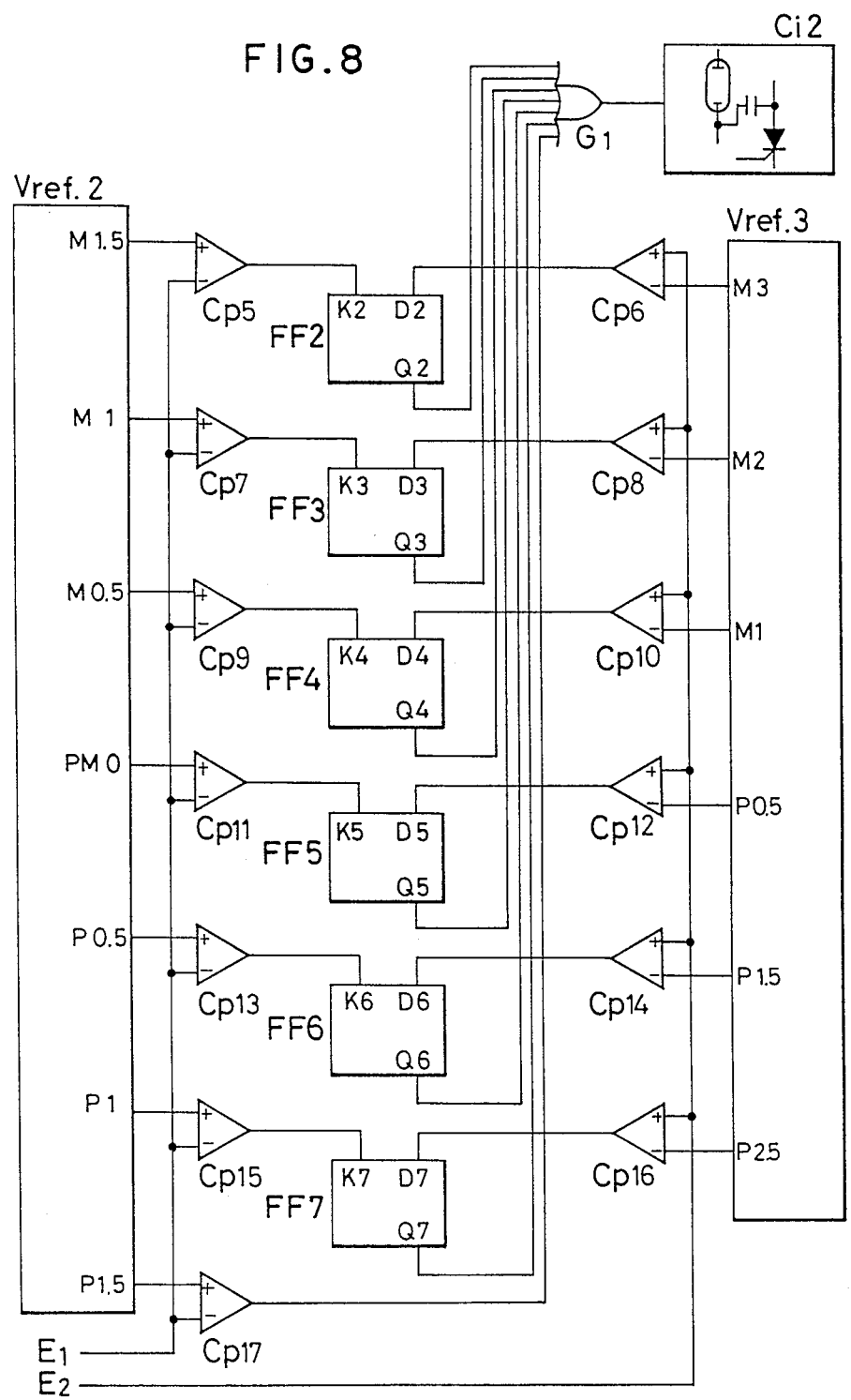
FIGS. 8 is a block diagram illustrating a second embodiment of the present invention.

DESCRIPTION OF THE PREFERRED EMBODIMENTS:

(First Embodiment)

FIG. 1A illustrates a block diagram of a first embodiment.

A metering circuit Al is for measuring the light reflected from the object at the time of flash photographing. This metering circuit Al has a light-receiving element in which contrast light compensated elements PD1, PD2 and a condenser lens LE, such as those shown in FIGS. 3A, 3B, are formed into a module. The elements PD1, PD2 are respectively used for measuring a central portion and for measuring a surrounding portion and respectively have L, 25 distributions of sensitivity shown in FIGS. 2A–2D. In addition, the elements PD1, PD2 have overlapping sensitivity areas. Accordingly, the central portion differs from that of the so-called spot light reading. In addition, the outputs of the central portion photometric element PD1 and the surrounding portion photometric element PD2 are outputted through a known logarithm amplification and logarithm expansion integration circuit, the former as a voltage $E_1$ (hereinafter referred to as a photometric value for the center) and the latter as a voltage $E_2$ (hereinafter referred to as a photometric value for the surrounding field). In this circuit, the two photometric values $E_1$, $E_2$ are adjusted in such a manner that they are reduced from a supply voltage Vcc with an increase in the amount of light received, and are provided with identical output characteristics with respect to an object having a uniform reflectivity, as shown in FIG. 4A.

Referring again to FIG. 1A, a reference voltage generator Vref 1 which generates a reference voltage which shifts depending on the ISO sensitivity or the like of a film, and produce a reference voltage $PM_0$, i.e., a value corresponding to a reference exposure, a reference voltage $P_1$, i.e., a value representing an overexposure by 1.0 [EV] relative to the reference exposure, and two reference voltages $M_1$, $M_2$, i.e., values that are on the underexposure side by 1.0 [EV] and 2.0 [EV] relative to the same. In other words, the reference voltage $PM_0$ is set as a value that allows a reference exposure to be obtained with respect to an object having a uniform reflectivity if the emission is stopped when the photometric value $E_1$ for the center reaches the reference voltage $PM_0$. The method of determining the values of the reference voltages described above are one example, and it is assumed that the difference between the reference voltages has a ratio equivalent to 1 EV, but the method is not confined to the same.

The photometric value $E_1$ for the center is inputted to comparators Cp1 and Cp4, while the photometric value $E_2$ for the surrounding field is inputted to comparators Cp2 and Cp3. As reference voltages for the respective comparators Cp1 to Cp4, the reference voltage $M_1$ is inputted to the comparator Cp1, the reference voltage $PM_0$ is inputted to the comparator Cp2, the reference voltage $M_2$ is inputted to the comparator Cp3, and a reference voltage selected by a reference voltage changeover circuit Ci1, which will be described later, is inputted to the comparator Cp4. A latch circuit FF1 latches the output of the comparators Cp2 and Cp3 upon being triggered by the inversion of the output signal of the comparator Cp1, and delivers them respectively as outputs Q1, Q2 to selection terminals A, B of the reference voltage changeover circuit Ci1. The reference voltage $P_1$, the reference voltage $PM_0$, and the reference voltage $M_1$ are respectively inputted to input terminals $I_1$–$I_3$ of the reference voltage changeover circuit Ci1. Depending on the state of the selection terminals A, B, any of the reference voltages $M_1$, $PM_0$, and $P_1$ of the input terminals $I_1$–$I_3$ is outputted to an output terminal $O_1$, as shown FIG. 1B.

The output of the reference voltage changeover circuit Ci1 is inputted as a reference voltage to the comparator Cp4 and is compared with the photometric value $E_1$ for the center. An inversion output signal of the comparator Cp4 from "L" to "H" is supplied to a known emission stop controlling circuit Ci2 as an emission stop signal so as to cause a light emitting tube to stop emission.

A description will now be given of the operation.

The metering circuit A1 is reset until the light emitting tube starts emission, and the respective photometric values $E_1$, $E_2$ indicate initial voltage values prior to the start of integration.

Upon starting of the emission, the photometric values $E_1$, $E_2$ indicate light-quantity integration values with the elapse of time, and gradually decrease in response to the amounts of light received by the metering elements PD1, PD2. At an arbitrary time, the photometric values E1, E2 can be classified into the following three relationships:

$$E_1 \approx E_2 \qquad (i)$$

$$|E_1 \uparrow| < |E_2 \uparrow| \qquad (ii)$$

$$|E_1 \uparrow| > |E_2 \uparrow| \qquad (iii)$$

(i) is a case where the reflectivity of the object is uniform, and requires no particular correction, and the emission may be stopped when the photometric value $E_1$ for the center reaches the reference voltage $PM_0$ corresponding to a predetermined reference exposure.

(ii) is a case where the light quantity integration in the central portion advances and is a case where the background is black, as shown in FIG. 6C, or there is utterly no reflecting object. If the emission stop is controlled under the same conditions as those for (i), the object which is frequently located in the central portion is liable to undergo an overexposure due to the influence of the brightness of the surrounding portion. Accordingly, exposure compensating control is required in this case.

(iii) is a case where the light-quantity integration in the surrounding portion advances and, for instance, a golden folded screen is present in the background, as shown in FIG. 7C, or the light from the light-emitting tube is reflected and is printed. If the emission stop is controlled under the same conditions as those for (i), the main object is liable to undergo an underexposure by being affected by the brightness in the surrounding portion. Accordingly, exposure correction becomes necessary in this case as well.

In the first embodiment, the three conditions of (i) to (iii) described above are discriminated, and the emission stopping timing is controlled as follows:

First, when the photometric value $E_1$ for the center reaches the reference voltage $M_1$, the output of the comparator Cp1 is inverted to "H", and triggers the latch circuit FF1, thereby latching the outputs of the comparators Cp2, Cp3 at that time. As shown in the table of truth values shown in FIG. 1B, the aforementioned conditions (i) to (iii) are discriminated through a combination of the outputs Q1, Q2 of the latch circuit FF1.

In the case of the condition (ii), as shown in the graph of FIG. 6A, since the photometric value $E_2$ for the surrounding field has not reached the reference voltage $M_2$, both outputs of the comparator Cp2 and Cp3 remain at "L". Accordingly, both selection terminals A and B of the reference voltage changeover circuit Ci1 are at "L", and, as shown in the table of truth values of FIG. 1B, the reference voltage M1 is output to the output terminal $O_1$ of the reference voltage changeover circuit Ci1. As a result, an output STP of the comparator Cp4 is inverted to "H" when the photometric value $E_1$ for the center reaches the reference voltage $M_1$, thereby forming an emission stop signal for the emission stop controlling circuit Ci2.

As described above, under the conditions where the exposure of the main object in the central portion becomes an overexposure if the emission stop is controlled in the same way as under the condition (i) above, an appropriate exposure can be obtained if the emission is completed when the photometric value $E_1$ for the center shows a value which is on the underexposure side by 1 [EV]. This is because, if the main object is smaller than the field of view of a metering system in the central portion, even if the central portion is an underexposure in terms of the average, the main object is brighter than that, and a more appropriate light quantity is imparted thereto than in a conventional system. It should be noted that if the main object is equivalent to or greater than the field of view of the metering system in the central portion, a determination is made that the case falls under the condition (i).

The case of (i) is the case where the light-quantity integration values $E_1$, $E_2$ in the central portion and the surrounding portion are substantially identical, and the reference voltage $PM_0$ is output to the output terminal $O_1$ of the reference voltage changeover circuit Ci1 through an operation similar to that in the case of (ii). Accordingly, since the reference voltage $PM_0$ is input to the comparator Cp4, the emission is stopped when the photometric value $E_1$ for the center reaches the reference voltage $PM_0$ corresponding to the reference exposure. In this case, since the exposure in the surrounding portion is substantially equivalent to that in the central portion (within ±1 [EV]), an appropriate exposure can be obtained by controlling the emission stop with the photometric value $E_1$ for the center, as described above.

In the case of (iii), the photometric value $E_2$ for the surrounding field exceeds the reference voltage $PM_0$ when the latch circuit FF1 is triggered in the same way as described above. Accordingly, the reference voltage $P_1$ appears in the output terminal $O_1$ of the reference voltage changeover circuit Ci1, the reference voltage $P_1$ is input to the comparator Cp4, and when the photometric value $E_1$ for the center reaches the reference voltage $P_1$, the emission stop signal is output. In other words, the emission is stopped when the central portion displays a value representing a value which is on the overexposure side by 1 [EV]. The reason for this is that, if the main object is smaller than the field of view of the central-portion metering system, even if the exposure of the central portion may be an overexposure in terms of the average, the main object is darker than that, and a more appropriate light quantity can be imparted thereto than the conventional system.

(Second Embodiment)

In the first embodiment, the timing of an emission stop is determined on the basis of the magnitude of the photometric value $E_2$ for the surrounding field at the time when the photometric value $E_1$ for the center reaches the predetermined reference voltage $M_1$. In the second embodiment, attention is focused on the fact that the reading changes monotonously from a voltage corresponding to an exposure which is an underexposure side of a reference exposure to a voltage corresponding to an overexposure side thereof, and that the greater the difference between the photometric value $E_1$ for the center and the photometric value $E_2$ for the surrounding field, the greater the amount of correction in exposure control should be. Specifically, an arrangement is provided such that emission is stopped if, when the monotonously changing photometric value $E_1$ for the center consecutively reaches a plurality of first reference voltages, the photometric value $E_2$ for the surrounding field has reached a second reference voltage determined in correspondence with the first reference voltage. In addition, the more the first reference voltage moves toward the under- or overexposure side relative to a reference exposure, the greater the difference between the first reference voltage and the second reference voltage is set.

FIG. 8 is a block diagram illustrating a second embodiment of the present invention. Although the metering circuit A1 is not illustrated, it is assumed that the metering circuit A1 is identical with that of the first embodiment, and the emission stop controlling circuit Ci2 is also identical with that of the first embodiment.

In FIG. 8 illustrating the second embodiment, Vref 2 denotes a reference voltage generator for the central photometric value $E_1$, while Vref 3 denotes a reference voltage generator for the photometric value $E_2$ for the surrounding field. As reference voltages, the reference voltage generating portion Vref 2 has seven voltage values of M1.5, M1, M0.5, $PM_0$, P0.5, P1.5, P1 and P1.5. The reference voltage generating portion Vref 3 has six voltage values of M3, M2, M1, P0.5, P1.5, and P2.5. Here, the meaning of the reference characters is the same as in the first embodiment. For instance, M1.5 means a voltage corresponding to an exposure which is on the underexposure side by 1.5 [EV] relative to a reference exposure; $PM_0$, a voltage corresponding to the reference exposure; and P2.5, a voltage corresponding to an exposure which is on the overexposure side by 2.5 [EV] relative to the reference exposure. The photometric value $E_1$ for the center of the metering circuit A1 is input to the comparators Cp5, 7, . . . , 13, 15, 17. At the same time, the aforementioned reference voltages M1.5-P1.5 are respectively supplied from the reference voltage generator Vref 2 as reference voltages Meanwhile, the photometric value $E_2$ for the surrounding field is input to the comparators Cp6, 8, . . . , 14, 16 and the aforementioned reference voltages M3-P2.5 are respectively supplied from the reference voltage generator Vref 3. In addition, upon being triggered by the inversion of the outputs of the comparators Cp5, 7, . . . , 15 for the photometric value $E_1$ for the center, latch circuits FF2-FF7 are arranged to latch the outputs of the comparators Cp6, 8, . . . , 16 for the photometric value $E_2$ for the surrounding field as data. Outputs Q2-Q7 of the latch circuits FF2-FF7 take an OR in a multiple-input OR gate G1, and the OR signal is supplied to the emission stop controlling circuit Ci2. Accordingly, in the embodiment having the above-described arrangement, correction is provided in units of 0.5 [EV] from −1.5 to +1.5 relative to the reference exposure.

A description will now be given of the operation. It is assumed that, prior to the emission, the latch circuits FF2-FF7 are reset, and all the outputs Q2-Q7 are at "L". Hence, the output STP of the OR gate G1 is also at "L".

When the emission is started, the photometric value $E_1$ for the center and the photometric value $E_2$ for the surrounding field change monotonously in accordance with the object, as shown in FIGS. 4-7, for instance.

First, when the photometric value $E_1$ for the center reaches the reference voltage M1.5 corresponding to $-1.5$ [EV], the comparator Cp5 is inverted to "H", and triggers the latch circuit FF2. The case where an appropriate exposure is obtained if the emission is stopped at this first timing is case of the aforementioned condition (ii) (FIGS. 6A–6C) where the light-quantity integration of the photometric value $E_2$ for the surrounding field appreciably lags behind that of the photometric value $E_1$ for the center. In brief, this is the case where the central field is liable to be overexposed appreciably. In this case, therefore, an appropriate exposure can be obtained if control is effected in such a manner that the emission is stopped when the photometric value $E_2$ for the surrounding field is on the underexposure side by 1.5 [EV] relative to the photometric value $E_1$ for the center. That determination is made by the comparator Cp6. The output of the comparator Cp6 is "H" when the photometric value $E_2$ for the surrounding field indicates a value which is on the underexposure side by 1.5 [EV] relative to the photometric value $E_1$ for the center, i.e., a value which is on the underexposure side relative to a reference voltage M3 corresponding to a value representing $-3$ [EV] relative to the reference exposure. This output "H" is fetched from a data input terminal D2 by the latch circuit FF2 at the aforementioned trigger timing, and is instantly transmitted from the output terminal Q2 to the OR gate G1. Then, the emission stop signal is instantly input to the emission stop controlling circuit Ci2 from the OR gate G1, thereby stopping the emission.

In a case where the emission is not stopped at the aforementioned first timing, the emission continues in that state. Subsequently, when the photometric value $E_1$ for the center reaches the reference voltage M1 corresponding to a value representing $-1$ [EV] relative to the reference exposure, the comparator Cp7 is inverted, and a second timing is obtained. The case where an appropriate exposure is obtained if the emission is stopped at this second timing is the case where the photometric value $E_2$ for the surrounding portion is biased toward the underexposure side with respect to the photometric value $E_1$ for the center. Since the emission is stopped at the first timing when the difference between the two is 1.5 [EV] or more, at the second timing, it suffices to effect a lighter degree of correction ($-1$ [EV]) than the correction at the first timing. Accordingly, the reference voltage M2 corresponding to a value representing $-2$ [EV] relative to the reference exposure is supplied from the reference voltage generator Vref 2. Then, if the photometric value $E_2$ for the surrounding field does not reach the reference exposure M2 at the second timing, i.e., if the photometric value $E_2$ for the surrounding portion is on the underexposure side by 1.5 to 1.0 [EV] relative to the photometric value $E_1$ for the center ($-1.5$ [EV] to $-1.0$ [EV]), an emission preventing signal is output.

If the emission is not stopped at the second timing, a third timing is obtained by the comparator Cp9 when the photometric value $E_1$ for the center is the voltage M0.5 corresponding to $-0.5$ [EV] relative to the reference exposure. Then, the emission stops if the photometric value $E_2$ for the surrounding portion has not reached the reference exposure M1, i.e., if the photometric value $E_2$ for the surrounding portion is on the underexposure side by 1.0 [EV] to 0.5 [EV] relative to the photometric value $E_1$ for the center.

The foregoing is the case where underexposure-side correction relative to the reference exposure is carried out.

When the emission is not stopped at the above first to third timings, the photometric value $E_1$ for the center reaches the reference voltage $PM_0$ corresponding to the reference exposure, and the comparator Cp11 determines as to whether or not the emission is to be stopped at a fourth timing when the signal level is inverted to "H". In other words, unless, at the fourth timing, the photometric value $E_2$ for the surrounding portion has reached the reference voltage P0.5 corresponding to an overexposure by 0.5 [EV] relative to the reference exposure, the comparator Cp12 inputs an "H" output to the latch circuit FF5. As a result, the output Q5 of the latch circuit 55 becomes "H" at the fourth timing, and the emission stop signal is input to the emission stop controlling circuit Ci2 via the OR gate G1, thereby stopping the emission. In other words, at the fourth timing, the emission is stopped when the difference between the photometric value $E_1$ for the center and the photometric value $E_2$ for the surrounding portion is $-0.5$ [EV] to $+0.5$ [EV]. In brief, this condition is the aforementioned case of (i) where the reflection of a flash light in the object field is uniform, and no special correction is required.

Thereafter, overexposure-side correction is carried out in a similar manner by the outputs of the latch circuits FF6, FF7.

In addition, since the limit of the amount of correction on the overexposure side is set at $+1.5$ [EV] relative to the reference exposure, when the photometric value $E_1$ for the center reaches the reference voltage P1.5 corresponding to $+1.5$ [EV], the emission is stopped unconditionally irrespective of the photometric value $E_2$ for the surrounding portion. In other words, in this case, the output of the comparator Cp17 is inverted to "H", and the emission stop signal is input from the OR gate G1 to the emission stop controlling circuit Ci2. The correction values described above and their conditions are shown in the table below.

| Difference between the 111 and the 222 (Surrounding field relative to the center is:) | 111 for stopping the emission (Vref 2) | 222 serving as a condition for stopping the emission (Vref 3) |
| --- | --- | --- |
| 1.5 [EV] or less | $-1.5$ [EV] (M1.5) | $-3$ [EV] or less (M3) |
| $-1.5$ to $-1$ | $-1$ (M1) | $-2$ (M2) |
| $-1$ to $-0.5$ | $-0.5$ (M0.5) | $-1$ (M1) |
| $-0.5$ to 0.5 | $\pm 0$ (PM0) | 0.5 (P0.5) |
| 0.5 to 1 | 0.5 (P0.5) | 1.5 (P1.5) |
| 1 to 1.5 | 1 (P1) | 2.5 (P1.5) |
| 1.5 or more | 1.5 (P1.5) | — |

According to the second embodiment, by virtue of the above-described operation, the relationships between the photometric value $E_1$ for the center and the photometric value $E_2$ for the surrounding portion are clarified in terms of the two systems of reference voltages so as to effect correction of the exposure.

In this second embodiment, since all the circuits following the outputs of the comparators are digital circuits, the operation is carried out at high speed, so that this processing is suitable to processing for a short time such as in the light-quantity control of the electronic flash apparatus.

In the above-described second embodiment shown in FIG. 8, one "H" level input is supplied to the input terminal of the OR gate G1, and, if that signal is read, it is possible to display which light adjustment level has been selected. In addition, in cases where none of the inputs to the OR gate G1 are "H", there is the possibility of a shortage of the light quantity, it is possible to inform the photographer to that effect by monitoring the fact that the "H" level has not been input. (Third and Fourth Embodiments)

Although, in the first embodiment shown in FIG. 1A, a reference voltage used for determining an emission stop is selected in accordance with the photometric value $E_2$ for the surrounding portion when the photometric value $E_1$ for the center reaches the reference voltage $M_1$, it is possible to effect control of the emission similar to the abovedescribed control by fixing a reference voltage for determining the emission stop and by varying the output characteristics of the photometric value $E_1$ for the center.

(Third Embodiment)

Figure 9:
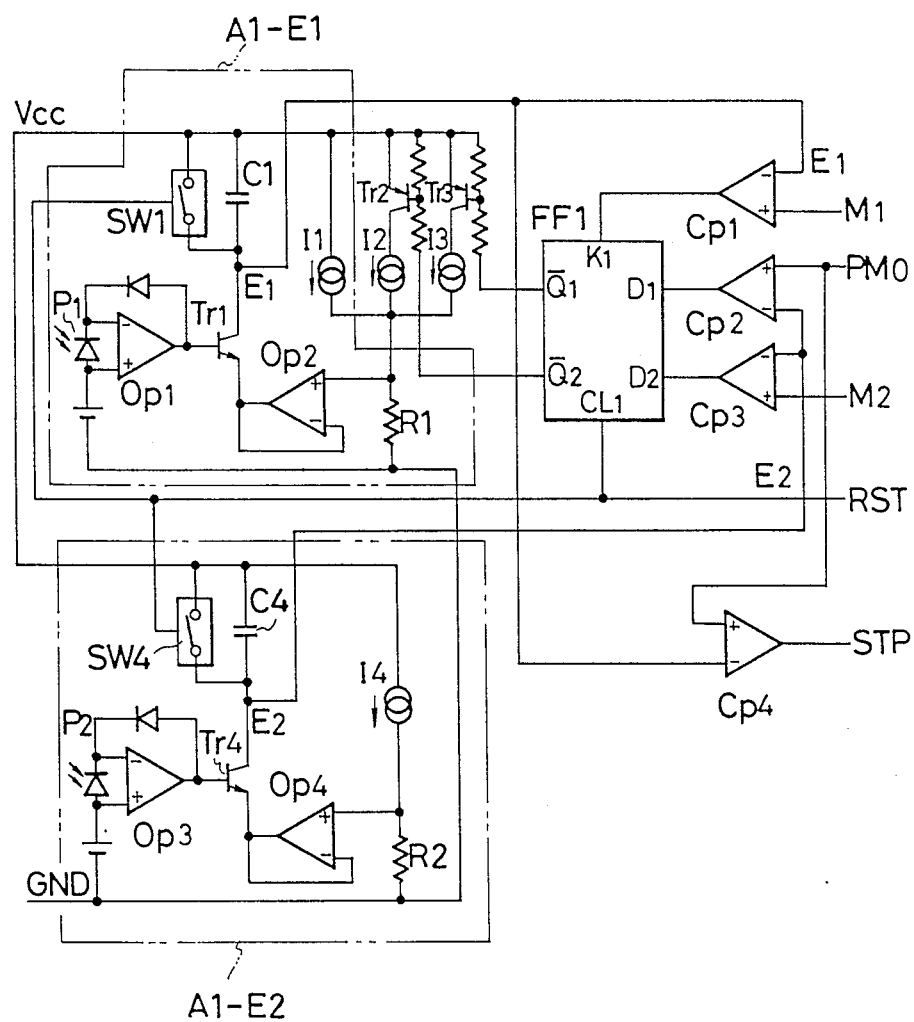
FIG. 9 is a block diagram illustrating a third embodiment in which correction is effected by changing the gain of a photometric amplifier.
Figure 10:
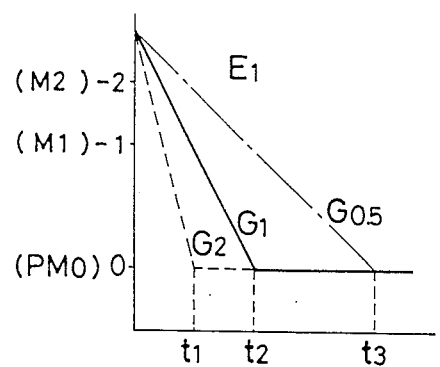
FIG. 10 is a graph illustrating the output characteristics of the photometric value $E_1$ for the center in a case where the gain of the photometric amplifier is changed.
Figure 11:
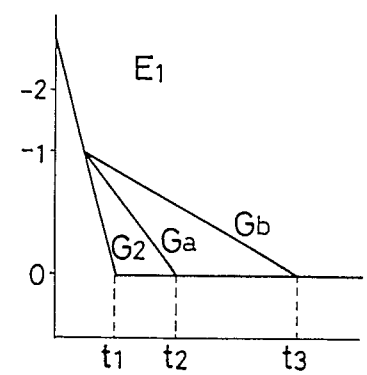
FIG. 11 is a graph illustrating output characteristics of the photometric value $E_1$ for the center accompanying a change in the gain in accordance with a third embodiment.
Figure 13:
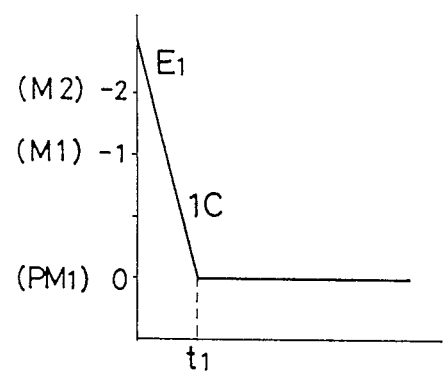
FIGS. 13 to 15 are graphs respectively illustrating r the output characteristics of the photometric value $E_1$ for the center accompanying a changeover of the capacity of a light amount integrating capacitor in accordance with the fourth embodiment.

In the third embodiment shown in FIG. 9, the gain of a photometric amplifier in the central portion is varied after detection of the fact that the photometric value $E_1$ for the center has reached the reference voltage $M_1$. In a case where the reference voltage for the emission stop is fixed to the reference voltage PM0 corresponding to an reference exposure, as shown in FIG. 10, the time until the emission stop, i.e., the light quantity, is inversely proportional to the gain of the photometric amplifier. That is, if it is assumed that, in the case of a gain $G_1$, the photometric value $E_1$ for the center reaches the reference voltage $PM_0$ at a timing $t_2$, the photometric value $E_1$ reaches the reference voltage $PM_0$ at a timing $t_3$ in the case of a gain $G_{0.5}$, i.e., one half of the gain $G_1$, and at a timing $t_1$ in the case of a gain $G_2$, i.e., two times the same. In addition, correction can be carried out in a similar manner by changing the gain into gains Ga and Gb midway in the emission, as shown in FIG. 11, and similar correction can be effected by quickening or delaying the emission stop through gain adjustment.

In the third embodiment shown in FIG. 9, a change in the gain of the photometric amplifier is carried out on the basis of the first embodiment shown in FIG. 1, and it is assumed that the method of changing the gain is based on U.S. Pat. No. 4,660,956 entitled "ELECTRONIC FLASH DEVICE". In FIG. 9, the same components as those of FIG. 1A are noted by the same reference characters, and the gain of the photometric amplifier in the central portion is adjusted by outputs $\overline{Q1}$, $\overline{Q2}$ of the latch circuit FF1. In the drawing, reference character A1-$E_1$ denotes a metering circuit for the central portion, and Op2 denotes a gain adjustment amplifier. A product of a constant current source I1 and a resistor R1 is output from the amplifier Op2 and serves as an emitter potential of an expanding transistor Tr2. Here, if the sensitivity of the light-receiving element PD1 and that of the light-receiving element PD2 are equal, a setting is made such that I1=I4 and R1=R4, thereby making identical the emitter potentials of the expanding transistors Tr1, Tr2. The gain determined by I1×R1, I4×R4 is set two fold the case of FIG. 1A.

Meanwhile, the center metering circuit A1-$E_1$ is provided with constant current sources I1, I3 in parallel with a constant current source I1. The arrangement is such that when the outputs $\overline{Q1}$, $\overline{Q2}$ of the latch circuit FF1 become "L", the transistors Tr3 and Tr4 are energized, and the current of the constant current source I2 and/or the current of the constant current source I3 is added to the current of the constant current source I1. Accordingly, the output of the gain adjustment amplifier Op2 becomes (I1+I2)×R1 or (I1+I2+I3)×R1, so that the emitter potential of the expanding transistor Tr1 is adjusted in the respective cases, thereby adjusting the gain of the photometric amplifier. Incidentally, C1 and C4 denotes light-quantity integrating capacitors, while SW1 and SW2 denote reset switches therefor.

Prior to the starting of an emission, the metering circuits A1-E1, A1-E2 and the latch circuit FF1 are reset by the signal at the reset terminal RST. In this case, since the outputs Q1, Q2 of the flip-flop FF1 are "H", the transistors Tr2, Tr3 are not energized, and the output of the gain adjustment amplifier Op2 becomes I1·R1. The gain at the start of metering is set by this I1·R1. Simultaneously upon the start of the emission, the reset terminal RST is set to "L" to cancel the resetting, and when the photometric value $E_1$ for the center reaches the reference voltage M1 corresponding to −1 [EV] relative to the reference exposure, the outputs of the comparators Cp2 and Cp3 are latched by the latch circuit FF1 in the same way as the embodiment shown in FIG. 1A. Accordingly, the outputs $\overline{Q1}$, $\overline{Q2}$ are determined in accordance with the table of truth values shown in FIG. 1B, and the current of the constant current source I2 and/or the current of the constant current source I3 is added to the current of the constant current source I1, thereby adjusting the gain.

In other words, (1) when the input data is latched by the latch circuit FF1, both outputs Q1, Q2 are "H" unless the photometric value $E_2$ for the surrounding portion has reached the reference voltage M2, and the emitter potential of the expanding transistor Tr1 is I1×R1.

(2) If the photometric value $E_2$ for the surrounding portion has reached the reference voltage $M_2$ and has not reached the reference voltage $PM_0$, the outputs $\overline{Q1}$, $\overline{Q2}$ are respectively "H" and "L", and the emitter potential of the expanding transistor Tr1 is (I1+I2)×R1.

(3) If the photometric value $E_2$ for the surrounding portion has reached the reference voltage $PM_0$, both outputs $\overline{Q1}$, $\overline{Q2}$ are "L", and the emitter potential of the expanding transistor is (I1+I2+I3)×R1.

In FIG. 11 which illustrates the output characteristics of the photometric value $E_1$ for the center, the output characteristics in the case of the aforementioned case (1) are determined by the photometric amplifier at a gain G2, and the photometric value $E_1$ for the center becomes the reference voltage $PM_0$ at a timing t1, thereby stopping the emission. The output characteristics in the aforementioned case (2) are determined by the photometric amplifier at a gain Ga, and the photometric value $E_1$ for the center becomes the reference voltage $PM_0$ at a timing t2, thereby stopping the emission. The output characteristics in the aforementioned case (3) are determined by the photometric amplifier at a gain Gb, and the photometric value $E_1$ of the center becomes the reference voltage $PM_0$ at a timing t3, thereby stopping the emission. If each gain is set in such a manner that the timings t1 to t3 become equivalent to the timings t1, t2, and t3 shown in FIGS. 5, 6A and 7A, it is possible to control the emission in the same way as FIG. 1A.

The third embodiment shown in FIG. 9 is characterized in that the reference voltage for stopping the emission is fixed to $PM_0$, and that the photometric value $E_1$ for the center gradually approaches the threshold level of the comparator $Cp4$. Thus, even if a spike-like pulse or the like is erroneously output from the latch circuit $FF1$ or the like and the gain consequently fluctuates instantly, the possibility of the emission being stopped as a result is small. Particularly immediately after the starting of emission, during which the amount of noise is large, the photometric value $E_1$ for the center is substantially remote from the reference voltage $PM_0$, thereby making it possible to provide a circuit configuration which is capable of withstanding the noise.

(Fourth Embodiment)

In the third embodiment shown in FIG. 9, the light emission is controlled through adjustment of the gain of the photometric amplifier in the central portion. However, similar control can be effected by changing the capacity of the light-quantity integrating capacitor in accordance with the photometric value $E_2$ for the surrounding portion when the photometric value $E_1$ for the center has reached the reference voltage $M1$.

Figure 12:
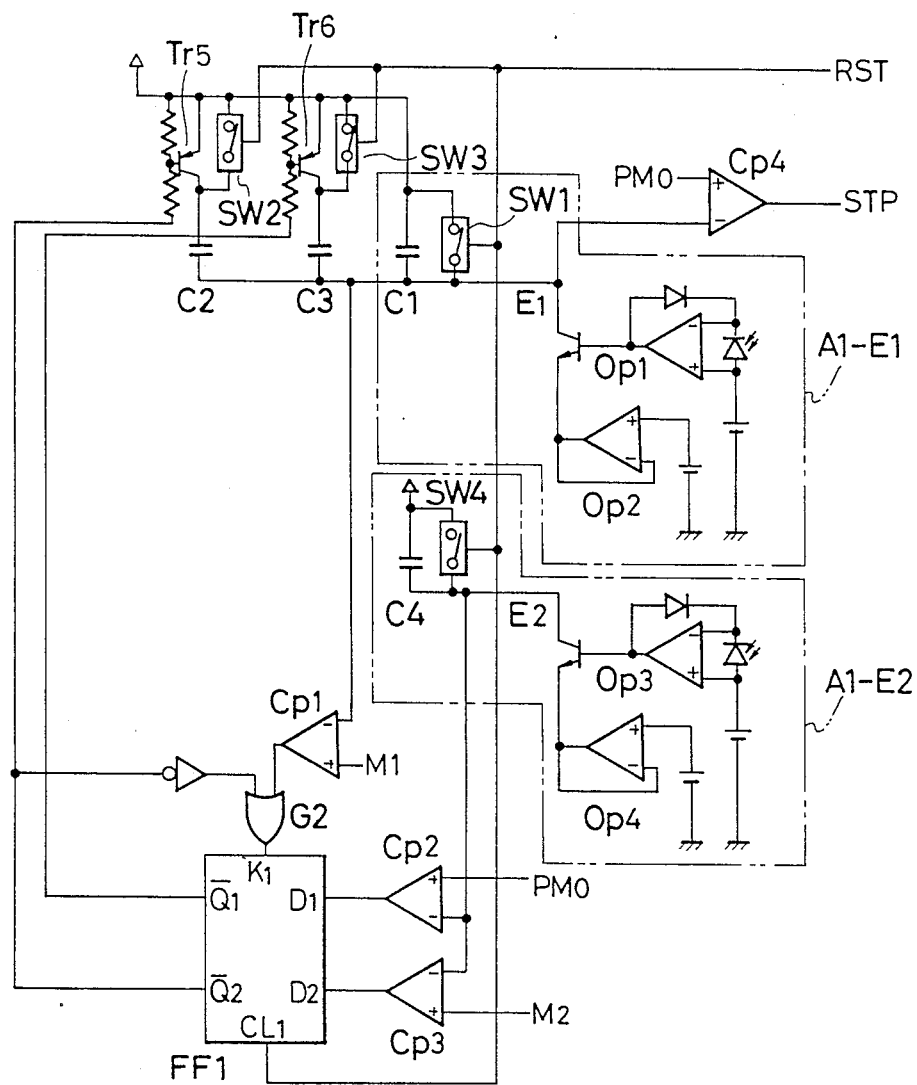
FIG. 12 is a block diagram illustrating a fourth embodiment in which correction is effected by changing the capacity of an integrating capacitor.

FIG. 12 illustrates a fourth embodiment of the present invention, and those components that are identical to those shown in FIG. 9 are denoted by the same reference characters.

In parallel with the light-quantity integrating capacitor $C1$ of the central portion metering circuit $A1-E_1$, a light-quantity integrating capacitor $C2$ of the identical capacity and a light-quantity integrating capacitor $C3$ having a 2-fold capacity are provided. The arrangement is such that, if switching transistors $Tr5$, $Tr6$ respectively connected in series to these light-quantity integrating capacitors $C2$, $C3$ are turned on and off, the capacity of the respective light-quantity integrating capacitors can be changed over to $C1$ ($=1C$), $C1+C2$ ($=2C$), and $C1+C2+C3$ ($=4C$). The capacity of the light-quantity integrating capacitor $C1$ and the capacity of the light-quantity integrating capacitor $C4$ in a surrounding portion metering circuit $A1-E_2$ are set to one half of the light-quantity integrating capacitor (not shown for FIG. 1 or the light-quantity integrating capacitors $C1$, $C4$ shown in FIG. 9. The switching transistors $Tr5$, $Tr6$ are controlled by the signal levels of the outputs $\overline{Q1}$, $\overline{Q2}$ of the latch circuit $FF1$.

A description will be given of the operation with reference to the table of truth values shown in FIG. 1B. First, when the photometric value $E_1$ for the center reaches the reference voltage $M_1$, the latch circuit $FF1$ is triggered, and the outputs of the comparators $Cp2$, $Cp3$ are latched by the latch circuit $FF1$. At that time, when the photometric value $E_2$ for the surrounding portion has not reached the reference voltage $M_2$, both outputs $\overline{Q1}$, $\overline{Q2}$ become "H", the switching transistors $Tr5$, $Tr6$ are not turned on, and the light-quantity integration progresses in the light-quantity integrating capacitors with the capacity $1C$. When the photometric value $E_1$ for the center reaches the reference voltage $PM_0$ at the timing $t1$, the output of the comparator $Cp4$ is inverted to "H", the emission stop signal appears at the output terminal $STP$, thereby stopping the emission.

Figure 14:
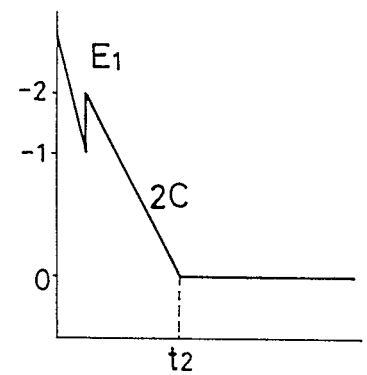

In addition, if the photometric value $E_2$ for the surrounding portion has reached the reference voltage $M_2$ and has not reached the reference voltage $PM_0$, the output $\overline{Q1}$ and $\overline{Q2}$ become "H" and "L", respectively, and the switching transistor $Tr5$ is turned on, while the switching transistor $Tr6$ off. Consequently, the capacities of the light-quantity integrating capacitors become $C1+C2$ ($=2C$), as shown in FIG. 14. Then, when the photometric value $E_1$ for the center reaches the reference voltage $PM_0$ at the timing $t2$, the emission stop signal is output to the output terminal $STP$, thereby stopping the emission.

Figure 15:
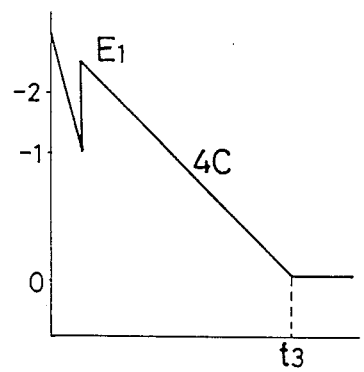

Furthermore, if the photometric value $E_2$ for the surrounding portion has reached the reference voltage $PM_0$, both outputs $\overline{Q1}$, $\overline{Q2}$ of the latch circuit $FF1$ become "L", and the switching transistors $Tr5$, $Tr6$ are turned on. Accordingly, the capacities of the light-quantity integrating capacitors subsequently become $C1+C2+C3$ ($=4C$), as shown in FIG. 15. Then, if the photometric value $E_1$ for the center reaches the reference voltage $PM_0$ at the timing $t3$, the emission stop signal is output to the output terminal $STP$, thereby stopping the emission.

In this fourth embodiment shown in FIG. 12, processing is effected at high speed since a system for changing over the capacities of the capacitors is adopted, and only three reference voltages can be used.

It should be note that the light-receiving elements $PD1$, $PD2$ used in the foregoing embodiments may be arranged as follows: For instance, by assuming that the light-receiving element $PD1$ effects the center-weighted metering and the light-receiving element $PD2$ the average metering, the $PD1$ is used as it is for metering the luminance in the central portion, and a value in which the output of the light-receiving element $PD1$ is subtracted from the output of the light-receiving element $PD2$ may be used as a photometric output corresponding to the surround portion. In addition, even if the above-described process of computation is not adopted, if outputs of the center-weighted metering and the average metering (it can be conceived that a portion to be subjected to weighted metering affects the overall object field) are used, it is possible to distinguish between the output from the central portion associated with the main object and the output from the surrounding portion which is not necessary associated with the same, these outputs can be used as they are. Furthermore, in the above description, a case has been described in which the probability of the main object being located at the central portion is high, and a reference has been given to the two regions of the central and surrounding portions. However, the arrangement is not confined to the same, and control may be effected in a manner similar to that of the above description with respect to a specific region associated with the main object and the remaining region.

Although, in the foregoing embodiments, a reference has not been given to fill-in flash synchronization, since there is no reflected light from the background in the case where, for instance, a picture of a main object is taken against the light out of doors, it is possible to effect appropriate emission control in accordance with the basic principle of the present invention. Even if there is natural light in the background, the range of a photographing environment to which the present invention can be applied is wide since, as compared with the shutter speed used under that condition, the time until the emission is determined in accordance with the present invention is sufficiently short.

In addition, in the foregoing embodiments, since the configuration comprises a photometric light-receiving element split into two parts, a number of comparators, and a simple logical circuit, a burden imposed on a controlling CPU of the camera is small.

Furthermore, since the TTL light-adjusting light-receiving element is disposed outside the optical path of the taking-lens of the camera and a light reflected on the film surface is measured, an image cannot be formed on the light-receiving element. For this reason, even if contrast light compensated metering is effected as described above, the metering does not lapse into a spot light metering, and, for instance, as disclosed in the embodiments, the distribution of photometric sensitivity of the light-receiving element disposed on the central portion becomes one of a center-weighted type. Accordingly, even in a case where there is no object in the central portion as in the case of photographing two people, it is possible to obtain an appropriate exposure in accordance with the above-described embodiments.

In accordance with the present invention, since a specific region of the object field (e.g., a central portion) and the remaining region (e.g., a surrounding portion) are metered, and the timing of the stopping of the emission is controlled on the basis of the magnitude of two photometric values at a certain timing, it is possible to effect correction for imparting an appropriate exposure to the main object located in the specific region irrespective of the state of the background or the surrounding portion. Accordingly, it is possible to prevent the face of a person located against a black background from becoming overexposed or the face of a person located in front of a golden folded screen from becoming underexposed without any particular operation.

(Fifth Embodiment)

Figure 16:
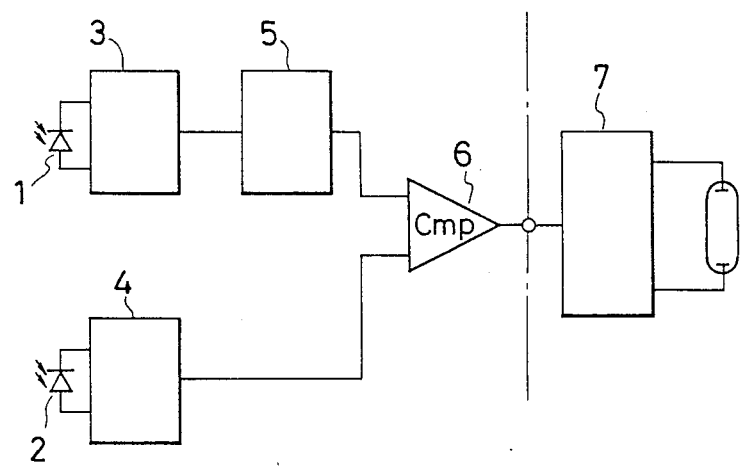
FIG. 16 is a block diagram illustrating a fifth embodiment of the present invention.

FIG. 16 is a block diagram illustrating a fifth embodiment of the present invention, and the light emission controlling device of the present invention is disposed between a flash light metering system and an emission stop controlling circuit 7.

In FIG. 16, a center-weighted metering system is composed of a light-receiving element 1 and a photometric amplifier 3, while an average metering system is composed of a light-receiving element 2 and a photometric amplifier 4.

In this embodiment, after a photometric output of the center-weighted metering system composed of the light-receiving element 1 and the metering amplifier 3 is converted by a conversion circuit 5, the output is input to one input terminal of a comparator 6 serving as comparing means. A photometric output of the average metering system composed of the light-receiving element 2 and the photometric amplifier 4 is input directly to the other input terminal of the comparator 6. The comparator 6 compares the conversion output of the conversion circuit 5 with the photometric output of the photometric amplifier 4, and outputs an emission stop signal to the emission stop controlling circuit 7 when the relative relationship between the two is inverted, thereby stopping the emission.

Figure 17:
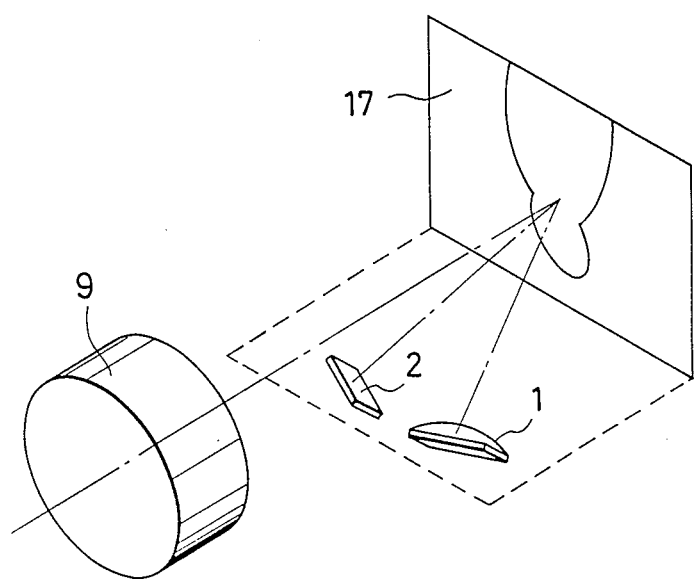
FIG. 17 is an explanatory diagram illustrating an optical layout of a metering system used in the embodiment shown in FIG. 16, by citing TTL automatic light adjustment as an example.

FIG. 17 is an explanatory diagram illustrating an optical system used in the embodiment shown in FIG. 16, and TTL automatic light adjustment is cited as an example in this embodiment.

It should be noted that, in the present invention, since it suffices if at least two metering systems respectively having different types of directionality with respect to the object field are present, the device itself may be disposed in the electronic flash apparatus or on the camera side for TTL automatic light adjustment, as shown in FIG. 17.

In FIG. 17, reference numeral 9 denotes a taking-lens, and an object image is formed on a focal plane 17 by means of the taking-lens. An actual metering is performed when, for instance, a focal plane shutter is fully open, so that the focal plane 17 is constituted by a film surface.

For that reason, the light reflected from the focal plane 17 constituting the film surface is received by, for instance, the light-receiving elements 1, 2 disposed below a mirror box. Since the light-receiving elements 1, 2 cannot be disposed on the optical axis of the taking-lens 9, the light-receiving elements 1, 2 are arranged in such a manner as to view the film surface constituting the focal plane 17 from a predetermined position outside the optical axis of the taking-lens.

As for the light-receiving elements 1, 2, by virtue of the optical systems of the light-receiving elements, the light-receiving element 1 has the directionality of becoming weighted on the central portion, while the light-receiving element 2 has the directionality of average metering.

Referring again to FIG. 16, the photometric amplifiers 3, 4 have known amplification circuits having a gain changeover circuit corresponding to ISO sensitivity and a temperature compensating circuit, and output photometric voltages proportional to values of light-amount integration by the light-receiving elements 1, 2. Specifically, the photometric amplifiers output photometric voltages which decrease toward a GND potential with a supply voltage Vcc serving as a reference.

In addition, the gain adjustment by the photometric amplifiers 3, 4 is adjusted in such a manner that a reference exposure is obtained for each of the amplifiers 3, 4 independently with respect an object having a standard reflectivity when the value of light-amount integration reaches a reference voltage Vth in which the supply voltage Vcc is subtracted by a predetermined voltage, e.g., Vth=Vcc−0.5V.

Figure 18:
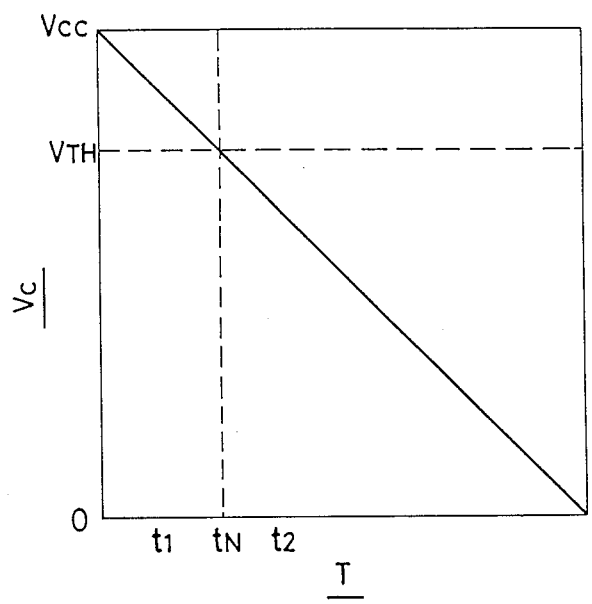
FIG. 18 is a graph illustrating a change with time of a photometric output with respect to the emission of light having a uniform emission strength.

The characteristics whereby this reference exposure can be obtained are shown in FIG. 18. In FIG. 18, if the emission intensity is fixed with respect to the passage of time, the photometric output representing a value of light-amount integration decreases in proportion to the time T, as shown in the straight line in the drawing.

With the conventional TTL automatic light adjustment, the emission stop signal is output when the photometric output Vc has reached the predetermined reference voltage Vth.

In the embodiment shown in FIG. 16, the measuring system for average metering is adapted to fetch a photometric output similar to that of the conventional system, as shown in FIG. 18.

On the other hand, a photometric output from the center-weighted measuring system using the photometric amplifier 3 is subjected to the following conversion by the conversion circuit 5.

The conversion circuit 5 employs, for instance, an analog multiplier, is capable of imparting a product of two inputs as one output, and can be provided by a normal one-chip IC.

If the computing system of the analog multiplier IC is based on a current input and a current output, it suffices if the difference between the supply voltage Vcc and the photometric output Vc is input by being subjected to voltage-current conversion. In addition, with respect to the current output as well, it suffices if an output voltage Vout is obtained by converting the same into a voltage through reverse conversion.

Accordingly, if the difference between the center-weighted photometric output of the photometric amplifier 3 and the supply voltage Vcc is imparted to both of the two input terminals of the analog multiplier constituting the conversion circuit 5, it is possible to obtain a conversion output through the squaring of input signals.

Figure 19:
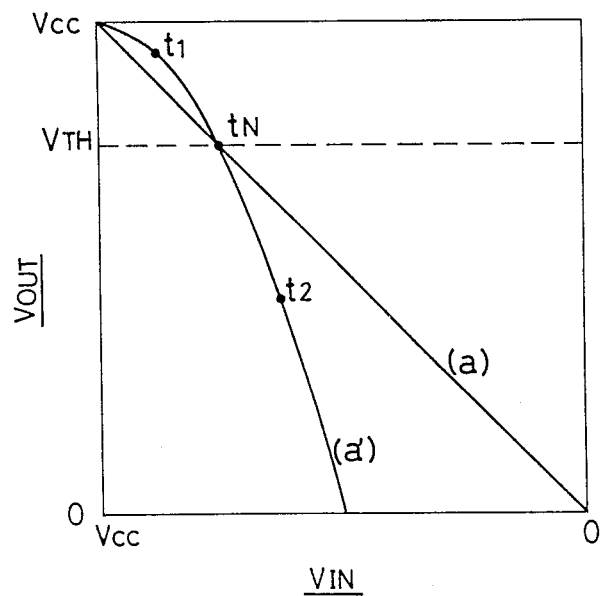
FIG. 19 is a graph illustrating input and output characteristics of a conversion circuit used in the embodiment shown in FIG. 16.

For this reason, if the gain of the analog multiplier constituting the conversion circuit 5 is adjusted appropriately, it is possible to obtain conversion characteristics as shown in FIG. 19.

In FIG. 19, the abscissas represent an input voltage Vin, i.e., the photometric output Vc, while the ordinates represent the output voltage of the conversion circuit 5. The case of no conversion is the linear characteristics indicated by a straight line (a), while the characteristics based on squaring conversion are shown by a curve (a').

In addition, a point of intersection between the straight line (a) and the curve (a') is at the reference voltage Vth.

If these conversion characteristics are expressed differently, in a region where the light-quantity integration has not progressed as compared with the reference voltage Vth, the output voltage Vout is converted to a voltage at which the light-quantity integration has not progressed.

Conversely, in the region where the light-quantity integration has progressed as compared with the voltage Vth, the output voltage Vout is converted to a voltage at which the light-quantity integration has progressed further.

In addition, in FIG. 19, although the time axis is not present, the relationships between the input voltage Vin and the output voltage Vout at each time are expressed as a set of points at times t1, tn, t2, etc., and it can be considered that the set of these points constitutes the conversion curve (a'). Accordingly, since no special time axis is taken into consideration, the following description will be given by handling the parameters of the voltage alone on the graph.

Figure 20:
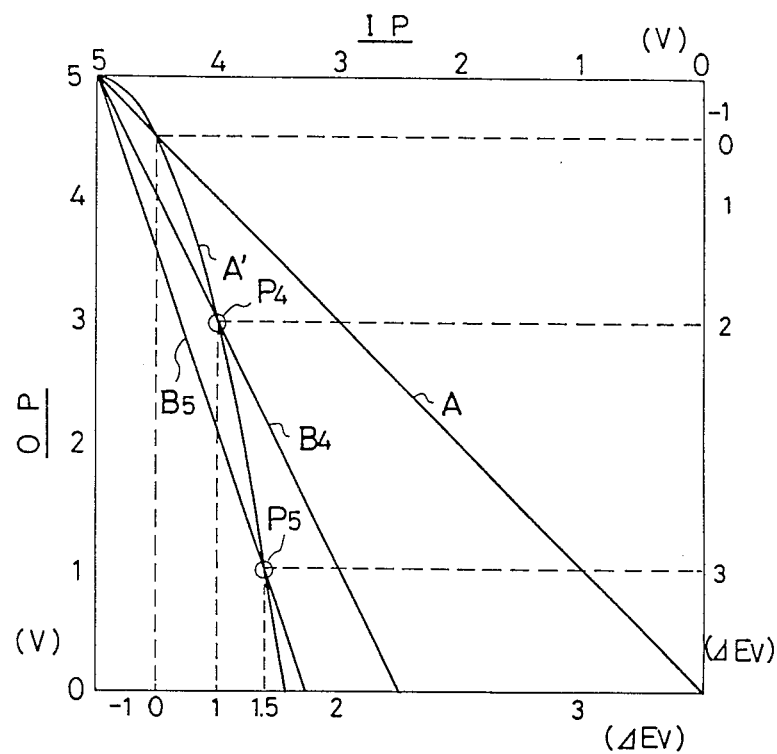
FIG. 20 is a diagram illustrating a light emitting timing in the embodiment shown in FIG. 16.

Referring now to FIG. 20, a description will be given of a specific embodiment of the exposure control in accordance with this invention.

FIG. 20 shows specific input and output voltage values Vin, Vout of FIG. 19, as well as a $\Delta EV$ value with respect to a reference exposure corresponding to Vin, Vout, and it is assumed that the supply voltage Vcc is 5V, and the reference voltage Vth corresponding to the reference exposure is 4.5V.

Figure 21:
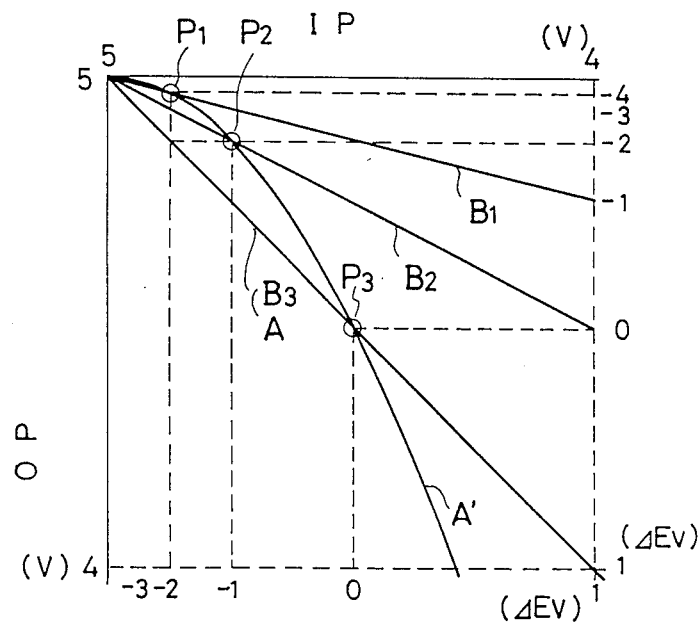
FIG. 21 is a partially expanded view of FIG. 20.

FIG. 21 is an expanded explanatory diagram in which a portion immediately after the starting of integration is extracted, and this drawing similarly illustrates input and output voltages and corresponding $\Delta EV$ values.

In FIGS. 20, 21, the straight line A represents the photometric output of the center-weighted metering in nonconverted form, while the curve A' shows the results of the squaring conversion by the conversion circuit 5.

If the straight lines B1–B5, which are obtained by the photometric outputs of the photometric amplifier 4 when average metering is effected in correspondence with the non-converted straight line A, are added to this graph, in a case where the integration of average metering lags behind the photometric output of the center-weighted metering, the inclination is small as shown by the straight lines B1, B2 of FIG. 21, whereas, in a case where the integration of average metering has progressed, the inclination of the straight lines becomes large as shown by the straight lines B4, B5 of FIG. 20.

In addition, with respect to an object such as a standard reflector, since the photometric outputs of the center-weighted metering and average metering become identical, the curve B3 which overlaps with the straight line A, as shown in FIG. 21, becomes the photometric output of the average metering in this case.

Next, a description will be given of the operation in a case where the emission is stopped at points of intersection between the straight lines B1 to B5 and the curve A' subjected to squaring conversion.

First, in FIG. 21, a point of intersection P1 between the straight line B1 and the curve A' is considered. In the state of this point of intersection P1, the center-weighted metering has already progressed to $-2 \Delta EV$. In other words, it is possible to ascertain $-2 \Delta EV$ by reading $\Delta EV$ corresponding to the input value IP from the point P1 of the curve A'.

In addition, the average metering has progressed only up to $-4 \Delta EV$. Accordingly, although the difference between the two is $2 \Delta EV$, if the state of exposure at this time is taken into consideration, this is the case where only the central portion of the object is bright, and the object is liable to become overexposed even with the conventional average metering or center-weighted metering. Specifically, this is a case of, for instance, a portrait taking against the background of a night view, and the face of a person wearing makeup is completely whitened.

Accordingly, in such a case, it is desirable to stop the emission at an early period, thereby effecting correction toward the underexposure side.

In other words, in this embodiment, the emission is stopped when the center-averaged photometric value given at the point of intersection P1 between the straight line B1 and the curve A' is $-2 \Delta EV$ or thereabout. Thus, although there may be cases where an underexposure takes place on the average, it is possible to obtain an appropriate exposure for the object itself.

It goes without saying that, if the rate of occupancy of the object in the object field is large, the difference between the average photometric output and the center-weighted photometric output does not become greater than that level, and correction is effected within a small range of correction, as will be clarified later. Accordingly, only in an extreme case as in the above-described case of a portrait taking against the background of a night scene, strong correction is effected at such as $-2 \Delta EV$ shown at the point P1.

Then, a description will be given of the case of the straight line B2 in which the integration of the average metering has not lagged behind substantially. At this time, the point of intersection between the straight line B2 and the curve A' is given at P2, and the emission can be stopped when the output of the center-weighted metering has corresponded to $-1 \Delta EV$. That is, this is the case where the difference between the center-weighted metering and the average metering is 1 [EV] or thereabout, and the amount of correction can be smaller than for the aforementioned point P1.

Next, the straight line B3 of FIG. 21 is the same as the straight line A, and the condition thereof is the same as the case where a standard reflector or the like is photographed. In this case, since a reference exposure based on the reference reflector and the reference voltage Vth corresponding to this reference exposure have already been determined, there is no need for correcting the exposure. For this reason, in FIG. 21 as well, the point of intersection P3 between the straight line B3 and the curve A' is a point where ΔEV is zero, indicating that no correction is carried out.

This accounts for the reason why adjustment is carried out at the time of setting conversion characteristics in such a manner that points corresponding to the reference exposure are subjected to no conversion.

The point of view in cases where the emission is stopped at the points of intersection P4, P5 between the straight lines B4, B5 and the curve A' in FIG. 20 is similar. For instance, when a light-emitting portion of a flash apparatus or the like is printed in a surrounding portion of a picture by being reflected by a mirror surface or the like, an appropriate exposure is imparted to the main object by effecting correction toward an overexposure side by +1.5 ΔEV such as at the point of intersection P5.

Figure 22:
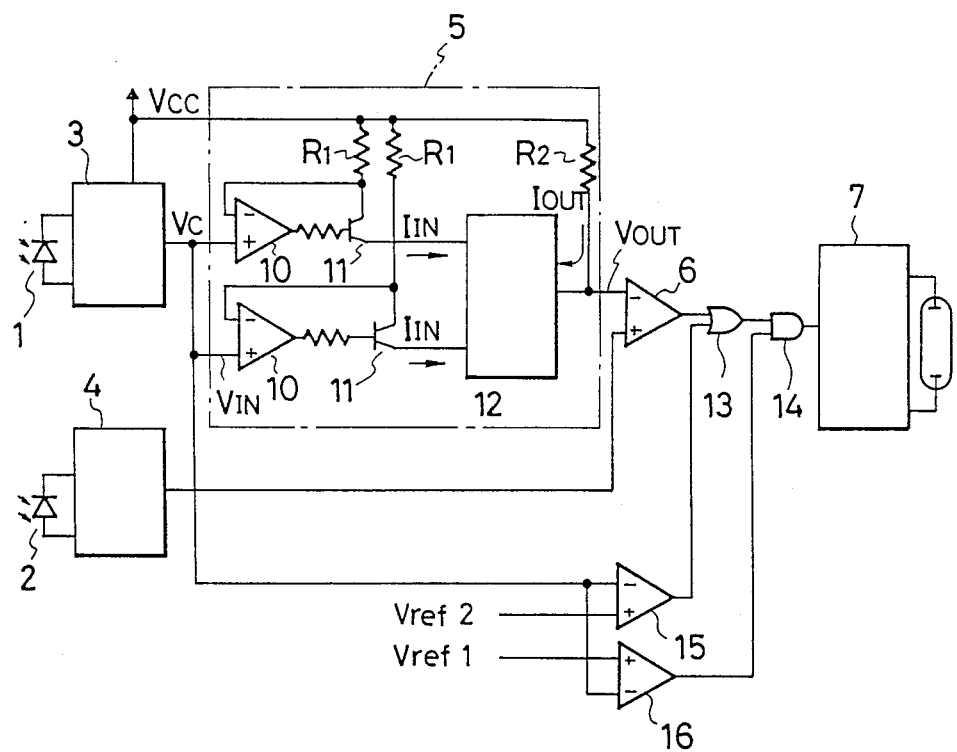
FIG. 22 is a circuit block diagram illustrating a specific example of the embodiment shown in FIG. 16.

FIG. 22 is a circuit block diagram illustrating a specific example of the conversion circuit 5 shown in FIG. 16.

In FIG. 22, the components other than the conversion circuit 5 are identical as those of the embodiment shown in FIG. 16. The conversion circuit 5 subjects an output voltage of the photometric amplifier 3 to current-current conversion through pairs of operational amplifiers 10, high-amplitude transistors 11, and resistors R1, respectively, and produces two input currents Iin corresponding to photometric outputs. These two input currents Iin are input to a multiplier 12, and effect the conversion of $$Iout = Iin^2.$$

a voltage proportional to the output current Iout is produced in a resistor R2, and this voltage is compared with a photometric voltage of the photometric amplifier 4 by the comparator 6.

In addition, immediately after the starting of photometry, as shown in FIG. 21, both input voltages to the input terminals of the comparator 6 are equivalent to the supply voltage Vcc, and the operation of the comparator 6 becomes unstable. Furthermore, if the actual characteristics of the multiplier 12 are taken into consideration, the conversion accuracy is deficient in a state in which the input current Iin is extremely small.

For that reason, in the example shown in FIG. 22, if it is assumed that the exposure correction can be effected up to the range of, for instance, −2 ΔEV, a prohibit command is supplied to an AND gate so that the emission stop signal will not be output from the comparator 6 to the emission stop controlling circuit 7 until −2 ΔEV. That is, the prohibit command is supplied to the AND gate as an L-level output until the output voltage Vc of the center-weighted photometric output voltage Vc becomes the reference voltage vrefl corresponding to −2 ΔEV at the comparator 16.

Furthermore, if there is any need to set a limit within a certain range with respect to correction toward the overexposure side as well, it is possible to provide the following arrangement: As shown in FIG. 22, an OR gate 13 is provided in the stage preceding the AND gate 14, the output of the comparator 15 is input to the other input terminal of the OR gate 13, and a reference voltage Vref2 for controlling the correction toward the overexposure side within a certain range is set in the comparator 15, thereby forcedly issuing the emission stop signal by an H-level output of the comparator 15 when the photometric output Vc of the photometric amplifier 3 has reached an exposure set as the reference voltage Vref2.

The foregoing is a specific description of the embodiment shown in FIG. 16, and the following two conditions are required of the conversion circuit 5 in this embodiment:

(a) Overall, a voltage corresponding to a reference exposure should be subjected to no conversion.

(b) If the conversion circuit is to be interposed in the center-weighted metering system, a value prior to obtaining the reference exposure should be converted to a value corresponding to an even smaller quantity of light, and a value after obtaining the reference exposure should be converted to a value corresponding to an even greater quantity of light.

In addition, in the foregoing embodiment, although squaring conversion is used in the conversion circuit 5, it is possible to obtain similar operation through N-multiplication (where N > 1) or conversion approximated to an exponential function.

Meanwhile, although, in the embodiment shown in FIG. 16, a photometric output of the center-weighted metering is subjected to conversion, similar results can be obtained if reverse conversion by the conversion circuit 5 is conversely carried out for the photometric output of the average metering system.

(Sixth Embodiment)

Figure 23:
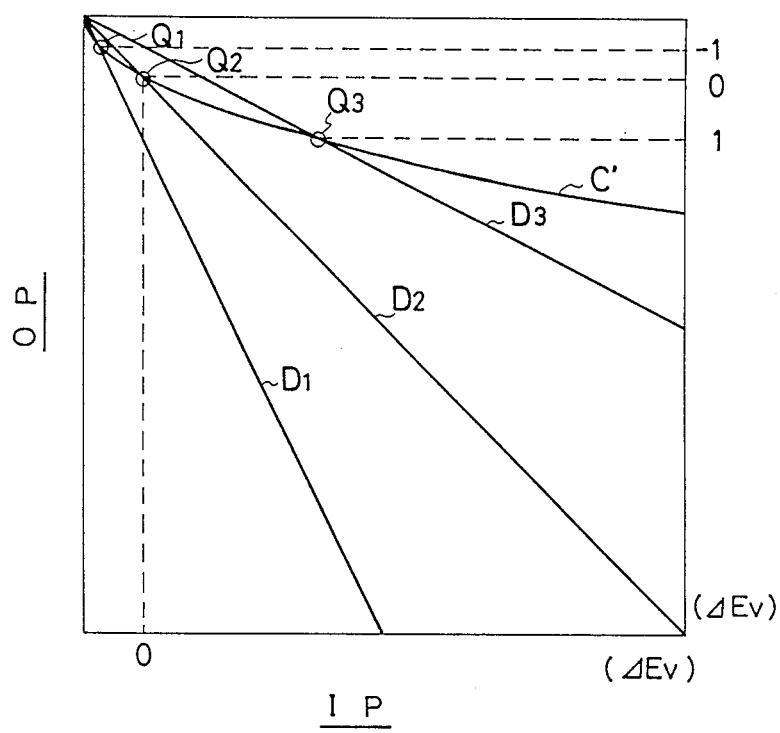
FIG. 23 is an explanatory diagram for obtaining a light emission timing in accordance with a sixth embodiment of the present invention in which a conversion circuit is provided on an average-metering system side shown in FIG. 16.

FIG. 23 illustrates voltage relationships in a case where average photometric outputs are subjected to square root conversion, and are compared with photometric outputs of the center-weighted metering. Incidentally, the configuration of this sixth embodiment is omitted since it is identical with that shown in FIG. 16.

In FIG. 23, the input/output relationships of the conversion circuit in cases where the average photometric outputs are subjected to square root conversion are shown by the curve C', and the photometric outputs of the center-weighted metering which are not subjected to conversion are denoted by the straight lines D1–D3. As a result, points of intersection Q1–Q3 between them can be obtained as points for stopping the emission.

In other words, it can be seen from FIG. 23 that in case where the light-quantity integration of the center-weighted metering is more advanced than the average photometric value, as shown by the straight line D1, the comparator 6 is inverted at the point of intersection Q1, and the emission is stopped when the center-weighted metering reads −1 ΔEV.

With respect to a uniform object, the emission is stopped at the point of intersection Q2, and no correction is effected. Furthermore, results which are similar to those of the point of intersection P3 of FIG. 21, for instance, can be obtained with respect to the point of intersection Q3 of the straight line D3 as well.

Accordingly, with respect to the photometric outputs of the plurality of metering systems in the present invention, relative relationships between them are important, and the conversion circuit may be interposed in any of the metering systems. In addition, it is possible to produce a desirable pattern of correction by using more complicated functions. In some cases, it is possible to determine an emission stopping timing by the inversion of relative relationships by interposing the conversion circuit in each measuring system.

As described above, in accordance with the present invention, at least photometric means are provided for different regions to be metered in a weighted manner with respect to the object field, at least one of the photometric outputs of this photometric means is converted and is compared, and the emission is stopped when the relative relationships of between the two outputs are inverted. Accordingly, it is possible to stop the emission of an optimum emission stop timing automatically after the start of the emission even without conducting a preliminary calculation requiring a preliminary emission or a determining operation by the photographer.

In addition, a multiplicity of reference voltages and comparators required for the conventional detailed light emission control can be dispensed with, and by virtue of a simple circuit configuration it is possible to effect an optimum exposure provided with detailed correction in correspondence with the situation of the object field.

Furthermore, since analog processing is effected for the exposure control in accordance with the present invention, the present invention has the advantage that fine stepless adjustment is possible.

What is claimed is:

1. A light emission controlling device for an electronic flash apparatus, comprising:
    first photometric means for metering a first region of an object field in a weighted manner and outputting first photometric information with a lapse of time;
    second photometric means for metering a second region of the object field in a weighted manner and outputting second photometric information with a lapse of time;
    comparing means for comparing said first photometric information with said second photometric information; and
    controlling means for determining a timing for outputting a light emission stop signal on the basis of the relationships between said first photometric information and said second photometric information.

2. A light emission controlling device for an electronic flash apparatus, comprising:
    first photometric means for metering a first region of an object field in a weighted manner and outputting a first integration value as first photometric information with a lapse of time;
    second photometric means for metering a second region of the object field in a weighted manner and outputting a second integration value as second photometric information with a lapse of time;
    comparing means for comparing said first integration value with said second integration value when one of said first integration value and said second integration value has reached a predetermined value below a reference exposure and producing an output dependent upon a difference between said integration values; and
    controlling means for outputting a light emission stop signal when said first integration value reaches a value that changes in response to the output of said comparing means.

3. A light emission controlling device for an electronic flash apparatus according to claim 2, wherein said first region is a central region of the object field, while said second region is a surrounding region of the object field.

4. A light emission controlling device for an electronic flash apparatus, comprising:
    first photometric means for metering a first region of an object field in a weighted manner and outputting a first integration value as first photometric information with a lapse of time;
    second photometric means for metering a second region of the object field in a weighted manner and outputting a second integration value as second photometric information with a lapse of time;
    amplifying means for amplifying one of said first integration value and said second integration value;
    comparing means which is adapted to compare said first integration value with said second integration value when said one of said integration values amplified by said amplifying means has reached a predetermined integration value below a reference exposure, and which is adapted to produce an output dependent upon a difference between said integration values; and
    controlling means for outputting a light emission stop signal when the difference between said integration values has reached a predetermined value.

5. A light emission controlling device for an electronic flash apparatus according to claim 4, wherein said first region is a central region of the object field, while said second region is a surrounding region of the object field.

6. A light emission controlling device for an electronic flash apparatus according to claim 4, wherein said amplifying means comprises a photometric amplifier.

7. A light emission controlling device for an electronic flash apparatus according to claim 4, wherein said amplifying means comprises a light-quantity integrating capacitor.

8. An electronic flash apparatus comprising:
    first photometric means for metering a first region of an object field in a weighted manner and outputting its result as a current;
    second photometric means for metering a second region of the object field in a weighted manner and outputting its result as a current;
    first accumulating means for accumulating the outputs of said first photometric means;
    second accumulating means for accumulating the outputs of said first photometric means;
    comparing means for comparing the amount accumulated in said first accumulating means with the amount accumulated in said second accumulating means; and
    controlling means for varying the capacity of said first accumulating means;
    wherein said controlling means changes said capacity in response to an output of said comparing means.

9. An electronic flash apparatus according to claim 8, wherein said first region is a central region of an object field, while said second region is a surrounding region of the object field.

10. A light emission controlling apparatus for the electronic flash apparatus according to claim 8, wherein said first accumulating means comprises a light-quantity integrating capacitor.

11. A light emission controlling apparatus for the electronic flash apparatus according to claim 8, wherein said second accumulating means comprises a light-quantity integrating capacitor.

12. A light emission controlling device for an electronic flash apparatus, comprising:

first photometric means for metering a first region of an object field in a weighted manner and producing a first output formed on the basis of an integral value thereof with a lapse of time;

second photometric means for metering a second region of the object field in a weighted manner and producing a second output formed on the basis of an integral value thereof with a lapse of time;

said first photometric means including means for nonlinearly converting an integration value by a predetermined function, said first output corresponding to the converted integration value;

comparing means for repeatedly comparing said first output with said second output; and controlling means for outputting a light emission stop signal when the relationship between said first output and said second output becomes a predetermined relationship.

13. A light emission controlling device for an electronic flash apparatus according to claim 12, wherein said predetermined relationship is formed when the difference between said first output and said second output becomes zero.

14. A light emission controlling device for an electronic flash apparatus according to claim 12, wherein said predetermined relationship is formed when the difference between said first output and said second output becomes a predetermined value greater than zero.

15. A light emission controlling device for an electronic flash apparatus according to claim 12, wherein said first region is a central region of an object field, while said second region is a surrounding region of the object field.

16. A light emission controlling device for an electronic flash apparatus according to claim 12, wherein said predetermined function is an N-multiplication function.

17. A light emission controlling device for an electronic flash apparatus according to claim 12, wherein said predetermined function is a square function.

18. A light emission controlling device for an electronic flash apparatus according to claim 12, wherein said predetermined function is a ½-multiplication function.

19. A light emission controlling device for an electronic flash apparatus according to claim 12, wherein said predetermined function is an exponential function.

20. A light emission controlling device for an electronic flash apparatus, comprising:

first photometric means for metering a first region of an object field in a weighted manner and outputting a first integration value at first photometric information with a lapse of time;

second photometric means for metering a second region of the object field in a weighted manner and outputting a second integration value as second photometric information with a lapse of time;

first comparing means for comparing said first integration value with a plurality of different reference values and producing an output dependent upon the results of the comparing;

second comparing means for comparing the second integration value with a plurality of different reference values and producing an output dependent upon the results of the comparing; and controlling means for outputting a light emission stop signal, the timing of which is determined by a relationship between the output of said first comparing means and the output of said second comparing means.

21. A light emission controlling device for an electronic flash apparatus according to claim 20, wherein said first comparing means comprises a first series of comparators for comparing said first integration value with respective reference values, said second comparing means comprises a second series of comparators for comparing said second integration value with respective reference values, each comparator being adapted to produce an output when an integration value applied thereto has a predetermined relationship to a reference value applied thereto, and wherein said controlling means comprises means adapted to receive pairs of outputs from corresponding comparators of said first series and said second series and for outputting said light emission stop signal in response to outputs from comparators of one of said pairs.

22. A light emission controlling device for an electronic flash apparatus according to claim 20, wherein said first region is a central region of the object field, while said second region is a surrounding region of the object field.

* * * * *